(12) United States Patent
Chauhan et al.

(10) Patent No.: US 11,398,997 B2
(45) Date of Patent: Jul. 26, 2022

(54) SYSTEM FOR INFORMATION TRANSFER BETWEEN COMMUNICATION CHANNELS

(71) Applicant: Bank of America Corporation, Charlotte, NC (US)

(72) Inventors: Sandeep Kumar Chauhan, Hyderabad (IN); Hari Gopalkrishnan, Plainsboro, NJ (US); Jagadish Reddy, Telengana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 247 days.

(21) Appl. No.: 16/907,345

(22) Filed: Jun. 22, 2020

(65) Prior Publication Data

US 2021/0400004 A1    Dec. 23, 2021

(51) Int. Cl.
*H04L 51/18* (2022.01)
*G06N 20/00* (2019.01)
*G10L 15/26* (2006.01)

(52) U.S. Cl.
CPC ............ *H04L 51/18* (2013.01); *G06N 20/00* (2019.01); *G10L 15/26* (2013.01)

(58) Field of Classification Search
CPC .......... H04L 51/18; G06N 20/00; G10L 15/26
See application file for complete search history.

(56) References Cited

U.S. PATENT DOCUMENTS

| | | | |
|---|---|---|---|
| 7,181,492 B2 * | 2/2007 | Wen | ......................... H04L 67/02 709/204 |
| 7,921,150 B1 | 4/2011 | Schwartz | |
| 7,926,080 B2 | 4/2011 | Baldwin et al. | |
| 8,000,241 B2 | 8/2011 | ONeill | |
| 8,023,410 B2 | 9/2011 | ONeill | |
| 8,506,402 B2 | 8/2013 | Gault et al. | |
| 8,527,147 B2 | 9/2013 | Daly et al. | |
| 8,533,166 B1 | 9/2013 | Sulieman et al. | |
| 8,560,331 B1 | 10/2013 | Pereira et al. | |
| 8,613,673 B2 | 12/2013 | Perry et al. | |
| 8,675,733 B2 | 3/2014 | Mabey et al. | |
| 9,064,259 B2 * | 6/2015 | Aleksin | ................... H04M 3/51 |
| 2003/0233240 A1 | 12/2003 | Kaatrasalo | |
| 2004/0160438 A1 | 8/2004 | Shih et al. | |
| 2004/0218564 A1 | 11/2004 | Henrikson | |
| 2004/0228169 A1 | 11/2004 | Widergren | |

(Continued)

*Primary Examiner* — Thomas J Dailey (74) *Attorney, Agent, or Firm* — Moore & Van Allen PLLC; Anup Shrinivasan Iyer (57) ABSTRACT

Systems, computer program products, and methods are described herein for information transfer between communication channels. The present invention is configured to electronically receive, via a first communication channel associated with an entity, information associated with a transfer of resources from a user at a first time; initiate one or more machine learning algorithms at on the information associated with the transfer of resources at the first time; generate, using the one or more machine learning algorithms, a summary of the information associated with the transfer of resources; electronically receive an indication that the user wishes to transfer to a second communication channel; and initiate a communication channel transfer protocol to transmit the summary of the information associated with the transfer of resources to the second communication channel.

18 Claims, 3 Drawing Sheets

(56) References Cited

U.S. PATENT DOCUMENTS

| | | |
|---|---|---|
| 2005/0031128 A1 | 2/2005 | Tomita et al. |
| 2005/0088983 A1 | 4/2005 | Wesslen et al. |
| 2005/0143874 A1 | 6/2005 | Peltz et al. |
| 2005/0207664 A1 | 9/2005 | Ramasastry et al. |
| 2005/0227621 A1 | 10/2005 | Katoh |
| 2009/0245500 A1* | 10/2009 | Wampler .............. H04M 7/006 379/265.09 |
| 2011/0156886 A1 | 6/2011 | Clinkscales et al. |
| 2018/0137295 A1* | 5/2018 | Sharma .............. H04L 63/0428 |

* cited by examiner

SYSTEM FOR INFORMATION TRANSFER BETWEEN COMMUNICATION CHANNELS

FIELD OF THE INVENTION

The present invention embraces a system for information transfer between communication channels.

BACKGROUND

In recent years, entities have embraced a number of new technological solutions to enable consumers to communicate with them to execute transfer of resources. In this regard, entities have established a number of communication channels such as video, real-time messaging, chatbots, artificial intelligence (AI), and/or the like to enable users to communicate with the entities.

There is a need for a system for information transfer between communication channels.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for information transfer between communication channels is presented. The system comprising: at least one non-transitory storage device; and at least one processing device coupled to the at least one non-transitory storage device, wherein the at least one processing device is configured to: electronically receive, via a first communication channel associated with an entity, information associated with a transfer of resources from a user at a first time; initiate one or more machine learning algorithms at on the information associated with the transfer of resources at the first time; generate, using the one or more machine learning algorithms, a summary of the information associated with the transfer of resources; electronically receive an indication that the user wishes to transfer to a second communication channel; and initiate a communication channel transfer protocol, wherein the communication channel transfer protocol is further configured to: activate the second communication channel; and initiate a real-time communication hand-off from the first communication channel to the second communication channel, wherein initiating further comprises transmitting the summary of the information associated with the transfer of resources to the second communication channel.

In some embodiments, the at least one processing device is further configured to: electronically receive, via the first communication channel, the information associated with the transfer of resources; and generate a transcript of the information associated with the transfer of resources.

In some embodiments, the at least one processing device is further configured to: electronically receive, via the first communication channel, the information associated with the transfer of resources in a speech format; initiate one or more speech recognition algorithms on the information associated with the transfer of resources; and generate, using the one or more speech recognition algorithms, the transcript of the information associated with the transfer of resources from the speech format.

In some embodiments, the at least one processing device is further configured to generate the summary of the information associated with the transfer of resources in real-time, wherein generating further comprises: parsing the information for one or more keyphrases, wherein the one or more keyphrases are compatible with one or more extraction algorithms; determine one or more features associated with the one or more keyphrases, wherein the one or more features comprises at least a length of the one or more keyphrases, a frequency of occurrence of the one or more keyphrases, and a number of characters in the one or more keyphrases; and concatenate the one or more keyphrases based on at least the one or more features to generate the summary of the information.

In some embodiments, the at least one processing device is further configured to generate the summary of the information associated with the transfer of resources in real-time, wherein generating further comprises: retrieving, from an information repository associated with the user, transcripts of information associated with past transfer of resources; assign a positive label to one or more keyphrases in each of the transcripts; determine the one or more features associated with the one or more keyphrases; and generate a training dataset with the one or more features and the positive labels;

In some embodiments, the at least one processing device is further configured to: initiate a training of the one or more machine learning algorithms with the training dataset; and determine a function based on at least training the one or more machine learning algorithms with the training dataset.

In some embodiments, the at least one processing device is further configured to: initiate an implementation of the function on the transcript of the information associated with the transfer of resources; determine the one or more keyphrases based on at least the implementation of the function on the transcript of the information; and generate the summary of the transcript of the information using the one or more keyphrases, wherein generating further comprises paraphrasing the keyphrases.

In some embodiments, the at least one processing device is further configured to: electronically receive an indication that the user has initiated a communication via the first communication channel to execute the transfer of resources, wherein the information associated with the transfer of resources is associated with the transfer of resources; determine that the first communication channel is unable to execute the transfer of resources; determine that the second communication channel is capable of executing the transfer of resources; initiate a communication channel transfer protocol, wherein initiating further comprises initiating a real-time communication hand-off from the first communication channel to the second communication channel based on at least determining that the second communication channel is capable of executing the transfer of resources; and transmit the summary of the information associated with the transfer of resources to the second communication channel.

In some embodiments, the at least one processing device is further configured to: electronically retrieve information associated with one or more pending transfer of resources previously initiated by the user with the entity that have not been executed; determine that the information associated with the transfer of resources is associated with at least one of the one or more pending transfer of resources previously initiated by the user; retrieve, from a knowledge repository, one or more resolutions previously used to execute one or more transfer of resources similar to the one or more pending transfer of resources; apply at least one of the one or more resolutions to execute the transfer of resources.

In some embodiments, the communication channel transfer protocol is further configured to: activate the second communication channel; and initiate a real-time communication hand-off from the first communication channel to the second communication channel, wherein initiating further comprises transmitting the summary of the information associated with the transfer of resources to the second communication channel.

In another aspect, a computer program product for information transfer between communication channels is presented. The computer program product comprising a non-transitory computer-readable medium comprising code causing a first apparatus to: electronically receive, via a first communication channel associated with an entity, information associated with a transfer of resources from a user at a first time; initiate one or more machine learning algorithms at on the information associated with the transfer of resources at the first time; generate, using the one or more machine learning algorithms, a summary of the information associated with the transfer of resources; electronically receive an indication that the user wishes to transfer to a second communication channel; and initiate a communication channel transfer protocol to transmit the summary of the information associated with the transfer of resources to the second communication channel.

In yet another aspect, a method for information transfer between communication channels is presented. The method comprising: electronically receiving, via a first communication channel associated with an entity, information associated with a transfer of resources from a user at a first time; initiating one or more machine learning algorithms at on the information associated with the transfer of resources at the first time; generating, using the one or more machine learning algorithms, a summary of the information associated with the transfer of resources; electronically receiving an indication that the user wishes to transfer to a second communication channel; and initiating a communication channel transfer protocol to transmit the summary of the information associated with the transfer of resources to the second communication channel.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS
OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like.

As used herein, a "resource transfer" of "transfer of resources" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. In the context of an entity such as a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution. In some embodiments, the user may authorize a resource transfer using at least a payment instrument (credit cards, debit cards, checks, digital wallets, currency, loyalty points), and/or payment credentials (account numbers, payment instrument identifiers). A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a purchase for a product, service, or the like from a merchant. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "authentication credentials" may be any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, a "communication channel" may refer to either to a physical transmission medium such as a wire, or to a logical connection over a multiplexed medium such as a radio channel in telecommunications and computer networking. Such a communication channel is used to convey an information signal, for example a digital bit stream, from one or several senders (or transmitters) to one or several receivers. Typically, a communication channel has a certain capacity for transmitting information, often measured by its bandwidth in Hz or its data rate in bits per second. In some embodiments, each communication channel may have a dedicated representative capable of executing transfer of resources received via the communication channel. The dedicated representative may be an employee of the resource distribution entity, an automated artificial intelligence (AI) system, an automated telephony system, and/or the like. For purposes of the invention, "communication channel" may refer to either the medium of transmission, the dedicated representative associated with the channel, or both.

Figure 1:
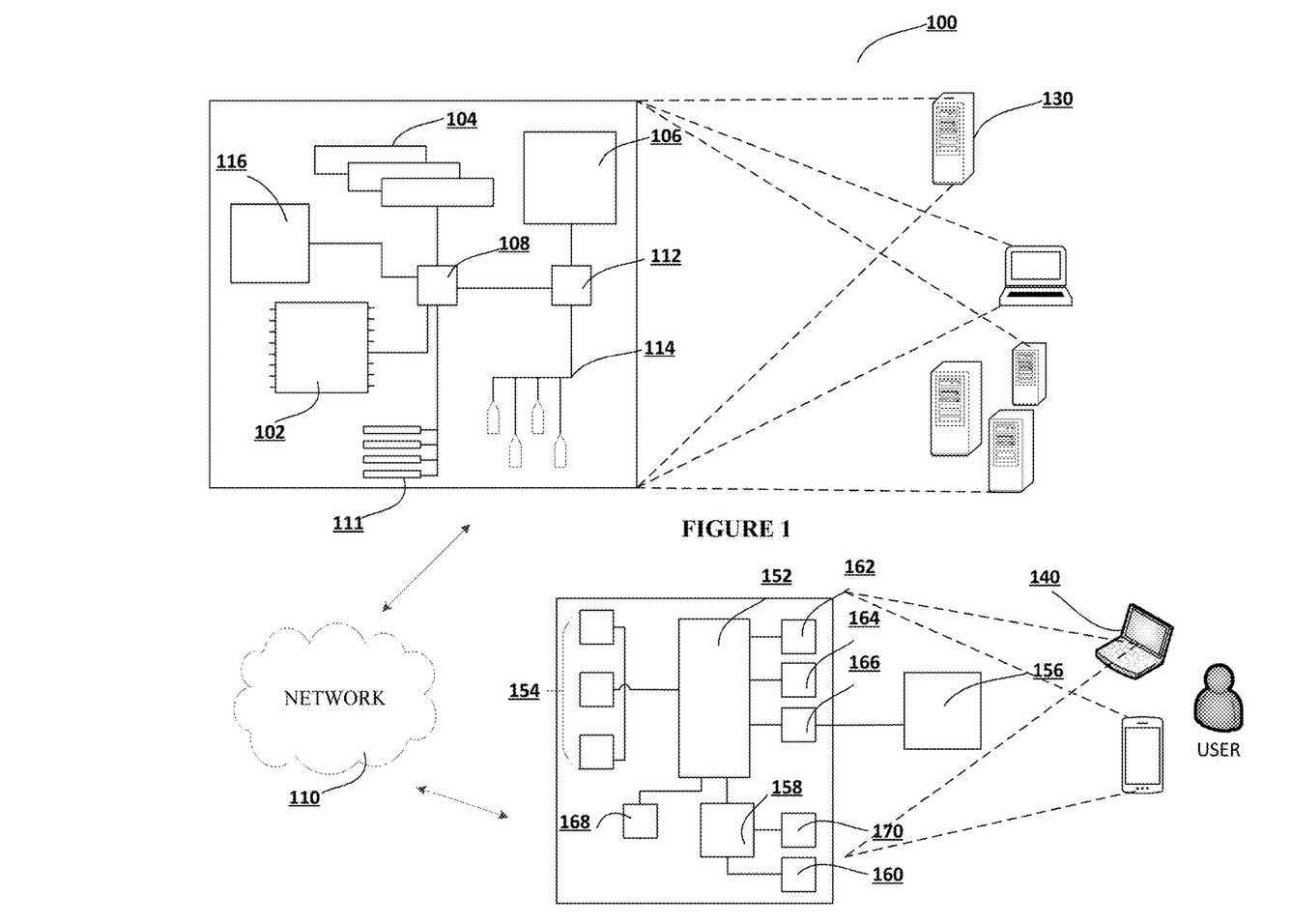
FIG. 1 presents an exemplary block diagram of the system environment for information transfer between communication channels, in accordance with an embodiment of the invention.

FIG. 1 presents an exemplary block diagram of the system environment for information transfer between communication channels 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute resource transfers using one or more applications stored thereon. The one or more applications may be configured to communicate with the system 130, execute a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

Resource distribution entities have embraced a number of new technological solutions to enable consumers to communicate with them to execute transfer of resources. In this regard, entities have established a number of communication channels such as video, real-time messaging, chatbots, artificial intelligence (AI), and/or the like to enable users to communicate with the entities. To initiate a transfer of resources with an entity, the user must typically access a representative of the entity via a communication channel. In many situations, the user is typically handed over between multiple communication channels before the transfer of resources is executed. Some communication channels may have dedicated representatives who are capable of executing the transfer of resources. Some communication channels have automated response systems that are capable of executing the transfer of resources. However, each time the user is handed over, the representative associated with the communication channel may have to be provided with the information associated with the transfer of resources to be effectively executed. This process of handing off communication and transferring all the information associated with the transfer of resources causes a delay in the execution of the transfer of resources. The present invention provides the functional benefit of implementing an automated deep learning and machine learning based system to generate concise and accurate summaries of the information associated with the transfer of resources to be communicated between communication channels. In doing so, the present invention enables efficient processing of the resource transfer even when the user is handed off between various communication channels.

Figure 2:
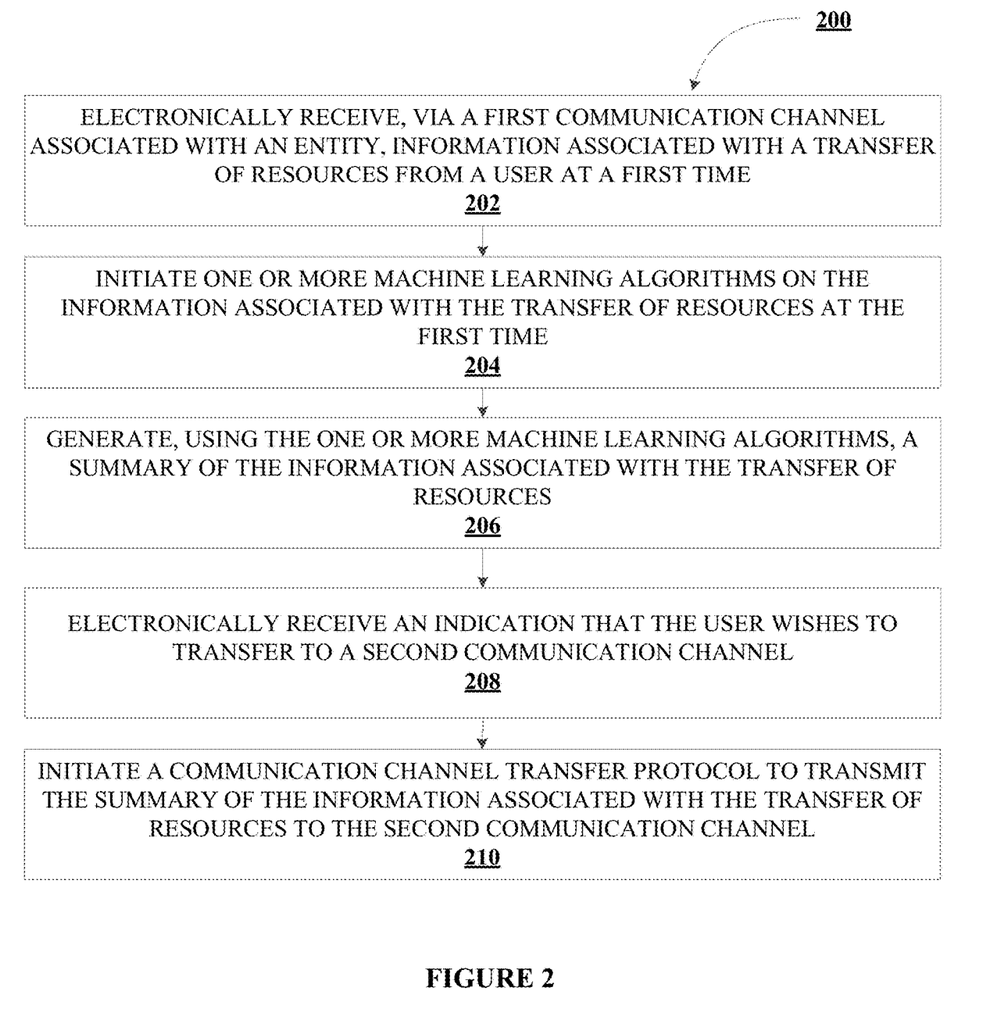
FIG. 2 illustrates a process flow for information transfer between communication channels, in accordance with an embodiment of the invention.

FIG. 2 illustrates a process flow for information transfer between communication channels 200, in accordance with an embodiment of the invention. As shown in block 202, the process flow includes electronically receiving, via a first communication channel associated with an entity, information associated with a transfer of resources from a user at a first time. In some embodiments, the system may be configured to electronically receive, via the first communication channel, the information associated with the transfer of resources. As described herein, the transfer of resources may be associated with the execution of a transaction. In one aspect, a user may initiate a communication with the entity via the first communication channel to initiate the execution of a transaction. In another aspect, a user may initiate a communication with the entity via the first communication channel to continue the execution of a transaction that has already been initiated. In this regard, the transaction may have been pending and requires additional information from the user to continue execution. In some embodiments, a user may initiate a communication with the entity via the first communication channel to re-initiate the execution of a transaction that was denied.

In some embodiments, the information associated with the transfer of resources may be received in a text format. In some other embodiments, the information associated with the transfer of resources may be received in a speech format. In response, the system may be configured to initiate one or more speech recognition algorithms on the information associated with the transfer of resources. In response, the system may be configured to generate, using the one or more speech recognition algorithms, the transcript of the information associated with the transfer of resources from the speech format.

Next, as shown in block 204, the process flow includes initiating one or more machine learning algorithms at on the information associated with the transfer of resources at the first time. In some embodiments, the system may be configured to implement any of the following applicable machine learning algorithms either singly or in combination: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in generating data relevant to the system 130.

Next, as shown in block 206, the process flow includes generating, using the one or more machine learning algorithms, a summary of the information associated with the transfer of resources. In some embodiments, the summary of the information associated with the transfer of resources may be generated based on abstractive summarization. Abstractive approach involves understanding the intent and context of the transcript and generating the summary. In this regard, the system may be configured to retrieve, from an information repository associated with the user, transcripts of the information associated with past transfer of resources to generate a training dataset. In response, the system may be configured to assign a positive label to one or more keyphrases in each of the transcripts. Then, the system may be configured to determine one or more features associated with the one or more keyphrases. In one aspect, the one or more features may include, but is not limited to a length of the one or more keyphrases, a frequency of occurrence of the one or more keyphrases, and a number of characters in the one or more keyphrases. Once the keyphrases and the features are determined, the system may be configured to generate a training dataset with the features and the positive labels.

In some embodiments, the system may be configured to initiate a training of the one or more machine learning algorithms with the training dataset. By way of training the machine learning algorithms, the system may be configured to determine a function. Once the function is determined, the system may be configured to initiate an implementation of the function on the transcript of the information associated with the transfer of resources. In some embodiments, the system may be configured to determine the one or more keyphrases based on at least the implementation of the function on the transcript of the information. In response, the system may be configured to generate the summary of the transcript of the information using the one or more keyphrases. In some embodiments, the system may be configured to generate the summary based on at least paraphrasing the keyphrases.

In some embodiments, the system may be configured to generate the summary of the information associated with the transfer of resources in real-time based on extraction summarization. In this regard, the system may be configured to parse the information for one or more keyphrases that are compatible with one or more extraction algorithms. In addition, the system may be configured to determine the one or more features associated with the one or more keyphrases. Once the keyphrases and the features are determined, the system may be configured to concatenate the one or more keyphrases based on at least the one or more features to generate the summary of the information.

Next, as shown in block 208, the process flow includes electronically receiving an indication that the user wishes to transfer to a second communication channel. In some embodiments, the user may wish to transfer to the second communication channel because the first communication channel is either unable to execute the transfer of resources, ineligible to execute the transfer of resources, does not have the authorization level to execute the transfer of resources, and/or the like. In some embodiments, the system may be configured to transfer the execution of the transfer of resources to the second communication channel automatically. In yet other embodiments, the system may be configured to transfer the execution of the transfer of resources to the second communication channel based on one or more trigger events associated with the first communication channel. In one aspect, the one or more trigger events may include an inability of the first communication channel to execute the transfer of resources.

In response, the system may be configured to activate the second communication channel, which has otherwise remained dormant. Once activated, the system may be configured to initiate a real-time communication hand-off from the first communication channel to the second communication channel. In some embodiments, initiating a real-time communication handoff may include transferring an ongoing data session from one communication channel connected to the network to another communication channel.

Next, as shown in block 210, the process flow includes initiating a communication channel transfer protocol to transmit the summary of the information associated with the transfer of resources to the second communication channel. In some embodiments, the system may be configured to transmit the summary of the information associated with the transfer of resources concurrently with the hand-off to the second communication channel. In some other embodiments, the system may be configured to transmit the summary of the information associated with the transfer of resources to the second communication channel immediately prior the hand-off to the second communication channel. In some other embodiments, the system may be configured to transmit the summary of the information associated with the transfer of resources to the second communication channel immediately after the hand-off to the second communication channel.

By providing the summary of the information to the second communication channel in addition to the hand-off to the second communication channel, the present invention reduces the time required by the second communication channel to process the transfer of resources for execution is reduced. Furthermore, with each communication channel hand-off, the amount of information (e.g., summary of the information associated with the transfer of resources) transmitted is reduced, thereby reducing the overall amount of resources used to execute the transfer of resources.

Figure 3:
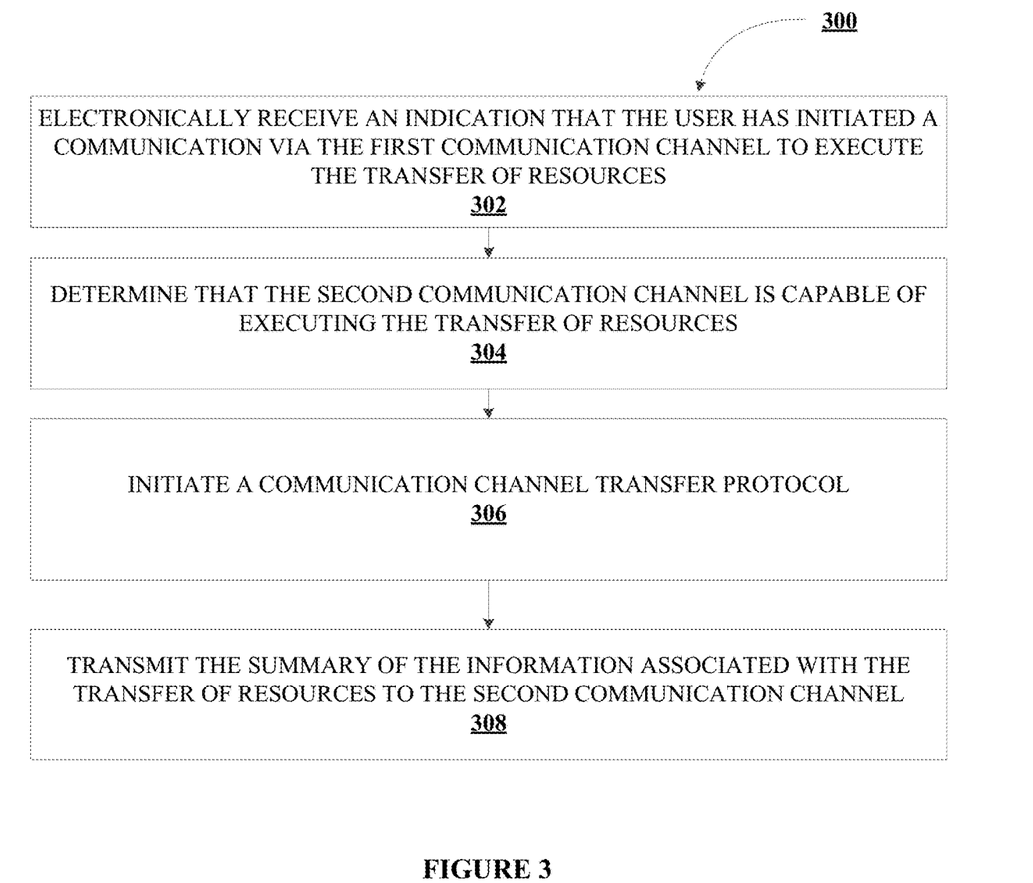
FIG. 3 illustrates a process flow for implementing a communication channel transfer protocol, in accordance with an embodiment of the invention

FIG. 3 illustrates a process flow for implementing a communication channel transfer protocol 300, in accordance with an embodiment of the invention. As shown in block 302, the process flow includes electronically receiving an indication that the user has initiated a communication via the first communication channel to execute the transfer of resources. Next, as shown in block 304, the process flow includes determining that the second communication channel is capable of executing the transfer of resources. In some embodiments, determining whether the second communication channel is capable of executing the transfer of resources may include determining whether the second communication channel has the capacity, as defined herein, to handle the process of executing the transfer of resources. In some other embodiments, determining whether the second communication channel is capable of executing the transfer of resources may include determining whether the second communication channel has the authentication level required to execute the transfer of resources. In this regard, the system may be configured to determine whether the second communication channel meets the authentication level required to execute the transfer of resources. If the second communication channel meets the authentication level required to execute the transfer of resources, the system may be configured to authorize the execution of the transfer of resources by the second communication level.

Next, as shown in block 306, the process flow includes initiating a communication channel transfer protocol. In one aspect, the communication channel transfer protocol may be configured to initiate a real-time communication hand-off from the first communication channel to the second communication channel. Next, as shown in block 308, the process flow includes transmitting the summary of the information associated with the transfer of resources to the second communication channel.

In some embodiments, the system may be configured to execute the transfer of resources using one or more resolutions previously used to execute one or more past transfer of resources. In this regard, the system may be configured to electronically retrieve information associated with one or more pending transfer of resources previously initiated by the user with the entity that have not been executed. In some embodiments, the system may be configured to determine that the information associated with the transfer of resources is associated with at least one of the one or more pending transfer of resources previously initiated by the user. Accordingly, the system may be configured to retrieve, from a knowledge repository, one or more resolutions previously used execute one or more transfer of resources similar to the one or more pending transfer of resources. In response, the system may be configured to apply at least one of the one or more resolutions to execute the transfer of resources.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for information transfer between communication channels, the system comprising:
   at least one non-transitory storage device; and
   at least one processing device coupled to the at least one non-transitory storage device, wherein the at least one processing device is configured to:
   electronically receive, via a first communication channel associated with an entity, information associated with a transfer of resources from a user at a first time;
   initiate one or more machine learning algorithms on the information associated with the transfer of resources at the first time;
   generate, using the one or more machine learning algorithms, a summary of the information associated with the transfer of resources, wherein generating further comprises:
      retrieving, from an information repository associated with the user, transcripts of information associated with past transfer of resources;
      assign a positive label to one or more keyphrases in each of the transcripts;
      determine the one or more features associated with the one or more keyphrases; and
      generate a training dataset with the one or more features and the positive labels;
   electronically receive an indication that the user wishes to transfer to a second communication channel; and
   initiate a communication channel transfer protocol to transmit the summary of the information associated with the transfer of resources to the second communication channel.

2. The system of claim 1, wherein the at least one processing device is further configured to:
   electronically receive, via the first communication channel, the information associated with the transfer of resources; and
   generate a transcript of the information associated with the transfer of resources.

3. The system of claim 2, wherein the at least one processing device is further configured to:
   electronically receive, via the first communication channel, the information associated with the transfer of resources in a speech format;
   initiate one or more speech recognition algorithms on the information associated with the transfer of resources; and
   generate, using the one or more speech recognition algorithms, the transcript of the information associated with the transfer of resources from the speech format.

4. The system of claim 3, wherein the at least one processing device is further configured to generate the summary of the information associated with the transfer of resources in real-time, wherein generating further comprises:
   parsing the information for one or more keyphrases, wherein the one or more keyphrases are compatible with one or more extraction algorithms;
   determine one or more features associated with the one or more keyphrases, wherein the one or more features comprises at least a length of the one or more keyphrases, a frequency of occurrence of the one or more keyphrases, and a number of characters in the one or more keyphrases; and
   concatenate the one or more keyphrases based on at least the one or more features to generate the summary of the information.

5. The system of claim 1, wherein the at least one processing device is further configured to:
   initiate a training of the one or more machine learning algorithms with the training dataset; and
   determine a function based on at least training the one or more machine learning algorithms with the training dataset.

6. The system of claim 5, wherein the at least one processing device is further configured to:
   initiate an implementation of the function on the transcript of the information associated with the transfer of resources;
   determine the one or more keyphrases based on at least the implementation of the function on the transcript of the information; and
   generate the summary of the transcript of the information using the one or more keyphrases, wherein generating further comprises paraphrasing the keyphrases.

7. The system of claim 1, wherein the at least one processing device is further configured to:
   electronically receive an indication that the user has initiated a communication via the first communication channel to execute the transfer of resources;
   determine that the first communication channel is unable to execute the transfer of resources;
   determine that the second communication channel is capable of executing the transfer of resources;
   initiate a communication channel transfer protocol, wherein initiating further comprises initiating a real-time communication hand-off from the first communication channel to the second communication channel based on at least determining that the second communication channel is capable of executing the transfer of resources; and
   transmit the summary of the information associated with the transfer of resources to the second communication channel.

8. The system of claim 1, wherein the at least one processing device is further configured to:
   electronically retrieve information associated with one or more pending transfer of resources previously initiated by the user with the entity that have not been executed;
   determine that the information associated with the transfer of resources is associated with at least one of the one or more pending transfer of resources previously initiated by the user;
   retrieve, from a knowledge repository, one or more resolutions previously used to execute one or more transfer of resources similar to the one or more pending transfer of resources; and
   apply at least one of the one or more resolutions to execute the transfer of resources.

9. The system of claim 1, wherein the communication channel transfer protocol is further configured to:
   activate the second communication channel; and
   initiate a real-time communication hand-off from the first communication channel to the second communication channel, wherein initiating further comprises transmitting the summary of the information associated with the transfer of resources to the second communication channel.

10. A computer program product for information transfer between communication channels, the computer program product comprising a non-transitory computer-readable medium comprising code causing a first apparatus to:
   electronically receive, via a first communication channel associated with an entity, information associated with a transfer of resources from a user at a first time;
   initiate one or more machine learning algorithms on the information associated with the transfer of resources at the first time;
   generate, using the one or more machine learning algorithms, a summary of the information associated with the transfer of resources, wherein generating further comprises:
      retrieving, from an information repository associated with the user, transcripts of information associated with past transfer of resources;
      assign a positive label to one or more keyphrases in each of the transcripts;
      determine the one or more features associated with the one or more keyphrases; and
      generate a training dataset with the one or more features and the positive labels;
   electronically receive an indication that the user wishes to transfer to a second communication channel; and
   initiate a communication channel transfer protocol to transmit the summary of the information associated with the transfer of resources to the second communication channel.

11. The computer program product of claim 10, wherein the first apparatus is further configured to:
   electronically receive, via the first communication channel, the information associated with the transfer of resources; and
   generate a transcript of the information associated with the transfer of resources.

12. The computer program product of claim 11, wherein the first apparatus is further configured to:
   electronically receive, via the first communication channel, the information associated with the transfer of resources in a speech format;
   initiate one or more speech recognition algorithms on the information associated with the transfer of resources; and
   generate, using the one or more speech recognition algorithms, the transcript of the information associated with the transfer of resources from the speech format.

13. The computer program product of claim 12, wherein the first apparatus is further configured to generate the summary of the information associated with the transfer of resources in real-time, wherein generating further comprises:
   parsing the information for one or more keyphrases, wherein the one or more keyphrases are compatible with one or more extraction algorithms;
   determine one or more features associated with the one or more keyphrases, wherein the one or more features comprises at least a length of the one or more keyphrases, a frequency of occurrence of the one or more keyphrases, and a number of characters in the one or more keyphrases; and concatenate the one or more keyphrases based on at least the one or more features to generate the summary of the information.

14. The computer program product of claim 1, wherein the first apparatus is further configured to:
    initiate a training of the one or more machine learning algorithms with the training dataset; and
    determine a function based on at least training the one or more machine learning algorithms with the training dataset.

15. The computer program product of claim 14, wherein the first apparatus is further configured to:
    initiate an implementation of the function on the transcript of the information associated with the transfer of resources;
    determine the one or more keyphrases based on at least the implementation of the function on the transcript of the information; and
    generate the summary of the transcript of the information using the one or more keyphrases, wherein generating further comprises paraphrasing the keyphrases.

16. The computer program product of claim 10, wherein the first apparatus is further configured to:
    electronically receive an indication that the user has initiated a communication via the first communication channel to execute the transfer of resources;
    determine that the first communication channel is unable to execute the transfer of resources;
    determine that the second communication channel is capable of executing the transfer of resources;
    initiate a communication channel transfer protocol, wherein initiating further comprises initiating a real-time communication hand-off from the first communication channel to the second communication channel based on at least determining that the second communication channel is capable of executing the transfer of resources; and
    transmit the summary of the information associated with the transfer of resources to the second communication channel.

17. The computer program product of claim 10, wherein the first apparatus is further configured to:
    electronically retrieve information associated with one or more pending transfer of resources previously initiated by the user with the entity that have not been executed;
    determine that the information associated with the transfer of resources is associated with at least one of the one or more pending transfer of resources previously initiated by the user;
    retrieve, from a knowledge repository, one or more resolutions previously used to execute one or more transfer of resources similar to the one or more pending transfer of resources; and
    apply at least one of the one or more resolutions to execute the transfer of resources.

18. A method for information transfer between communication channels, the method comprising:
    electronically receiving, via a first communication channel associated with an entity, information associated with a transfer of resources from a user at a first time;
    initiating one or more machine learning algorithms on the information associated with the transfer of resources at the first time;
    generating, using the one or more machine learning algorithms, a summary of the information associated with the transfer of resources, wherein generating further comprises:
        retrieving, from an information repository associated with the user, transcripts of information associated with past transfer of resources;
        assign a positive label to one or more keyphrases in each of the transcripts;
        determine the one or more features associated with the one or more keyphrases; and
        generate a training dataset with the one or more features and the positive labels;
    electronically receiving an indication that the user wishes to transfer to a second communication channel; and
    initiating a communication channel transfer protocol to transmit the summary of the information associated with the transfer of resources to the second communication channel.

* * * * *